United States Patent [19]

Thring

[11] Patent Number: 4,715,326

[45] Date of Patent: Dec. 29, 1987

[54] MULTICYLINDER CATALYTIC ENGINE

[75] Inventor: Robert H. Thring, San Antonio, Tex.

[73] Assignee: Southwest Research Institute, San Antonio, Tex.

[21] Appl. No.: 905,003

[22] Filed: Sep. 8, 1986

[51] Int. Cl.$^4$ .............................................. F02B 43/08
[52] U.S. Cl. ........................................ 123/3; 123/543; 123/568
[58] Field of Search ............... 123/1 A, 3, 143 B, 144, 123/272, 546, 543

[56] References Cited

U.S. PATENT DOCUMENTS

| | | | |
|---|---|---|---|
| 642,176 | 1/1900 | Thomson | 123/143 B |
| 1,105,047 | 7/1914 | Thomson | 123/143 B |
| 1,372,216 | 3/1921 | Casaday | 123/143 B |
| 1,819,825 | 8/1931 | Poyer | 123/143 B |
| 1,889,270 | 11/1932 | Thomas et al. | 123/546 |
| 2,091,410 | 8/1937 | Mallory | 123/143 R |
| 2,196,228 | 4/1940 | Prescott | 123/143 B |
| 3,177,856 | 4/1965 | Perkins | 123/68 |
| 3,923,011 | 12/1975 | Pfefferle | 123/143 B |
| 4,011,839 | 3/1977 | Pfefferle | 123/143 B |
| 4,114,567 | 9/1978 | Burton | 123/143 R |
| 4,344,405 | 8/1982 | Zaharis | 123/68 |
| 4,369,746 | 1/1983 | Thring | 123/272 |
| 4,389,983 | 6/1983 | Enga et al. | 123/143 B |
| 4,422,412 | 12/1983 | Norton | 123/3 |
| 4,512,673 | 4/1985 | Breguet | 123/272 |

Primary Examiner—E. Rollins Cross
Attorney, Agent, or Firm—Fulbright & Jaworski

[57] ABSTRACT

An unthrottled multicylinder catalytic engine having first and second cylinders with first and second pistons, respectively, reciprocating therein. A mixture of air and fuel is inserted into the first cylinder, compressed in the first cylinder, and combustion is initiated, if necessary, during start-up. A transfer passageway communication between the first and second cylinders receives the compressed mixture and a catalyst positioned in the passageway oxidizes or ignites the mixture to provide the power stroke for operating the second piston. Thereafter, the oxidized or burnt mixture is exhausted from the second cylinder. The compressed gas may be heated in the passageway by the exhaust heat.

8 Claims, 1 Drawing Figure

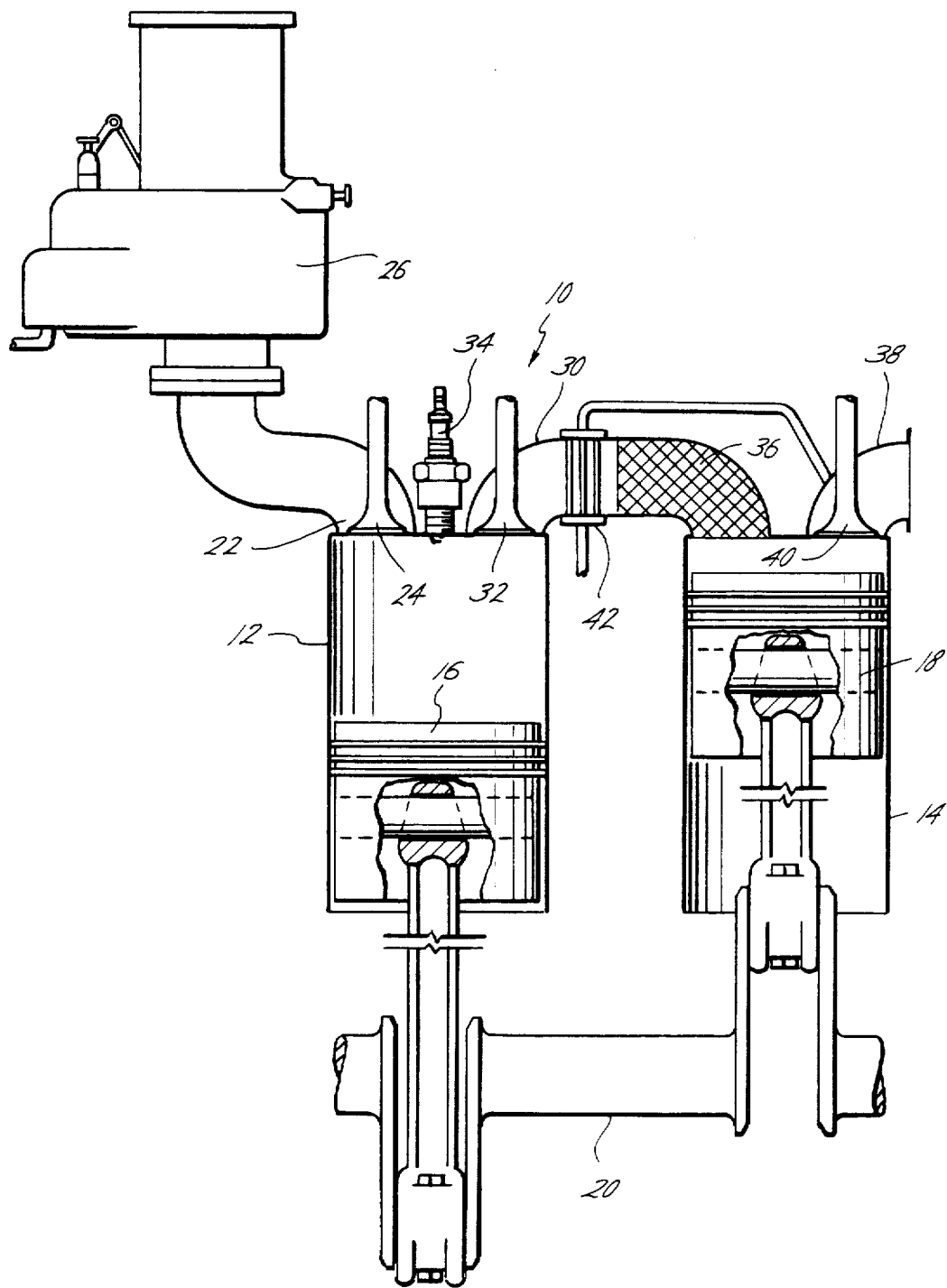

MULTICYLINDER CATALYTIC ENGINE

BACKGROUND OF THE INVENTION

It is desirable that an internal combustion engine be efficient, perform well over a varied load range, have good fuel economy and low atmospheric pollution. One of the types of engines used to achieve this end is the stratified charge engine, where a spark ignites a mixture in a zone where the air/fuel ratio is rich and the charge stratification allows unthrottled operation even at light loads. This tends to give good economy and low emissions of nitrogen oxide (NOX) and carbon monoxide (CO), but the emissions of unburned hydrocarbons (HC) tend to be high. The reason for the high hydrocarbons is that the flame is quenched by the lean air/fuel ratio before all of the fuel is burnt. In an attempt to overcome these problems, the catalytic engine was proposed. With the catalytic engine, fuel is injected directly into the engine combustion chamber and the air/fuel mixture is oxidized and ignited with the aid of a catalyst. The catalytic engine has the advantage of operating at low oxidation or flame temperatures, for example less than 3500° F. for reducing NOX and CO emissions, the catalyst in the engine cleans up the HC emissions without the need for a catalyst in the exhaust system, the engine operates over a wide range of compression ratios and as the fuel oxidation is by catalytic action, rather than spark or compression ignition, the engine will operate on fuels which have poor octane or cetane values. However, the disadvantage of a conventional catalytic engine is that the fuel cannot be carbureted and therefore (a) the engine must have an expensive fuel injection system and (b) gaseous fuels cannot be used.

The present invention overcomes these problems as well as providing an engine that uses a catalyst and allows operations over the load range without throttling and provides an engine which will, because the intake fuel/air mixture is premixed, use any fuel which can be carbureted including gaseous or liquid fuels.

SUMMARY

The present invention is directed to an unthrottled multicylinder catalytic engine having a first cylinder and a first piston reciprocating therein and a second cylinder and a second piston reciprocating therein. The first cylinder includes an intake port and an intake valve in the intake port. Air/fuel mixing means are provided connected to the intake port for providing a premixed air/fuel mixture to the first cylinder. The intake valve opens as the first piston draws the air/fuel mixture into the first cylinder and the intake valve is closed as the first piston moves upwardly to compress the mixture. A transfer passageway is provided in communication between the first and second cylinders. A transfer valve is in the passageway adjacent the first cylinder and opens when the mixture in the first cylinder is compressd for transferring the compressed mixture from the first cylinder toward the second cylinder. A catalyst is positioned in the passageway downstream of the transfer valve for oxidizing or igniting the compressed mixture when the transfer valve is closed thereby powering the second piston. An exhaust port is connected to the second cylinder and an exhaust valve is positioned in the exhaust port for opening and exhausting the combustion products from the second cylinder after the conclusion of the power stroke.

Still a further object of the present invention is the provision of a heat exchanger positioned adjacent the passageway and connected to the exhaust port for heating the compressed mixture in the passageway from the waste exhaust heat.

Yet a further object of the present invention is wherein the air/fuel mixing means includes a carburetor, or fuel injector.

Still a further object of the present invention is wherein the second piston leads the first piston by a crank angle of between 45° and 90°.

Still a further object of the present invention is the provision of a combustion initiating means, such as a spark plug, in the first cylinder for use during startup.

Yet still a further object of the present invention is the method of operating a catalytic internal combustion engine having first and second cylinders with first and second pistons, respectively, reciprocating therein. The method includes premixing an air/fuel mixture and inserting the mixture in the first cylinder, compressing the mixture in the first cylinder, transferring the compressed mixture from the first cylinder through a catalyst for igniting or oxidizing the compressed mixture thereby providing an expanding gas and transferring the expanding gas to the second cylinder providing a power stroke for the second piston, and then exhausting the burnt gases from the second cylinder. The method may further include heating the compressed mixture in the first cylinder and/or heating the compressed mixture as it leaves the first cylinder by passing it in heat exchange with the waste exhaust gas from the second cylinder.

Other and further objects, features and advantages will be apparent from the following description of a presently preferred embodiment of the invention, given for the purpose of disclosure and taken in conjunction with the accompanying drawing.

BRIEF DESCRIPTION OF THE DRAWING

The FIG. is a schematic, partly in cross section, illustrating the improved unthrottled catalytic engine of the present invention.

DESCRIPTION OF THE PREFERRED EMBODIMENT

Referring now to the drawing, the reference numeral 10 generally indicates the catalytic engine of the present invention and generally includes a first cylinder 12 and a second cylinder 14. A first piston 16 is reciprocally mounted in the first cylinder 12 and a second piston 18 is reciprocally mounted in the second cylinder 14. Any suitable means may be provided for reciprocating the pistons 16 and 18 such as a conventional crank shaft 20.

The first cylinder 12 includes an intake port 22 connected to the head of the cylinder 12 and an intake valve 24 positioned in the intake port 22 for opening and closing communication of the port 22 with the cylinder 12. An air/fuel mixing means, such as a carburetor 26, is connected to the intake port 22 for premixing air and fuel together prior to their admission into the cylinder 12. The intake valve 24 is opened as the first piston 16 moves downwardly for drawing in the air/fuel mixture into the cylinder 12 from the intake port 22. The intake valve 24 then closes and the piston 16 is moved upwardly to compress the mixture in the cylinder 12.

A transfer passageway 30 is provided between the first cylinder 12 and the second cylinder 14, preferably between their heads. A transfer valve 32 is provided in the passageway 30, preferably in the head of the cylinder 12, for allowing or blocking communication of the transfer passageway 30 with the cylinder 12. The valve 32 is closed while the air/fuel mixture is being drawn in to the cylinder 12 by the piston 16 and as the piston 16 travels upwardly to compress the mixture. The valve 32 is opened, just before the piston 16 reaches top dead center, to allow the now-compressed air/fuel mixture to be transferred into the passageway 30. A combustion initiating means such as a spark plug 34 is provided in the cylinder 12 for use during the startup of the engine 10 and is energized approximately the time that the valve 32 is opened for initiating ignition of the mixture, but once the catalyst is hot, as will be more fully described hereinafter, energization of the spark plug 34 is no longer needed.

A catalyst 36 is positioned in the passageway 30 downstream of the transfer valve 32. The catalyst 36 may be of any sutiable form and material such as in the form of metallic mesh, wool, ceramic monolith, or beads, and may contain platinum, rhodium, or other suitable catalytic material. After the compressed mixture leaves cylinder 12, the transfer valve 32 closes and the mixture flows through the catalyst 36 where it is oxidized with the aid of the catalyst, ignited and heat release is initiated causing an expansion of the air/fuel mixture. The burning expanding combustion gases then flow into the second cylinder 14 to provide the working stroke for driving the piston 18 downwardly. An exhaust port 38 is provided in the cylinder 14, preferably in the head, with an exhaust valve 40 positioned in the exhaust port 38 for exhausting burnt gases from the second cylinder 14. The valve 40 is closed during the power stroke but opens after the end of the power stroke to allow the upwardly moving piston 18 to eject the exhaust through the port 38.

For improving the thermal efficiency of the engine 10, a heat exchanger 42 may be provided in the transfer passageway 30 upstream of the catalyst 36 for receiving a portion or all of the hot exhaust gases from the port 12. The waste heat from the exhaust gases is applied to the compressed mixture in the passageway 30 before the heat release occurs by the action of the catalyst 36.

The pistons 16 and 18 are timed with any suitable actuation mechanism, such as the crank shaft 20, so that the piston 18 leads piston 16 by a crank angle of 45° to 90°, preferably 70°. The valves 24, 32 and 40 may be timed by the crank shaft 20 and any suitable valve mechanism to coordinate their movements with the pistons 16 and 18 as described above.

The present engine has the advantages that the fuel can be carbureted and therefore does not require an expensive fuel injection system, gaseous fuels can be used, the engine allows operation over the load rnage without throttling, the engine has low emissions of NOX and CO and HC, and the engine has no octane or cetane requirements. In addition, because the air/fuel mixture is premixed, any fuel which can be carbureted can be used, including gaseous or liquid fuels, such as natural gas, methane, propane, gasoline, or wide-cut petroleum fuel.

The method of the present invention is apparent from the foregoing description of the structure and operation of the engine. The method of operating a catalytic internal combustion engine having a first cylinder with a first piston reciprocating therein and a second cylinder with a second piston reciprocating therein includes premixing an air/fuel mixture and inserting the mixture into the first cylinder. the method also includes compressing the mixture in the first cylinder, transferring the compressed mixture from the first cylinder through a catalyst for igniting the compressed air/fuel mixture thereby providing an expanding gas, transferring the expanding gas to the second cylinder providing a power stroke for the second cylinder, and exhausting the expanding gas from the second cylinder. The method further includes initiating combustion of the compressed mixture in the first cylinder and/or heating the compressed mixture as it leaves the first cylinder from the heat from the waste heat exhaust gases from the second cylinder.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts and steps of the method will be readily apparent to those skilled in the art and which are encompassed within the spirit of the invention and the scope of the appended claims.

What is claimed is:

1. A multicylinder catalyst engine comprising,
a first cylinder and a first piston reciprocating therein,
a second cylinder and a second piston reciprocating therein,
said first cylinder including an intake port,
an intake valve in the intake port admitting all of the air and fuel for the engine,
air/fuel mixing means connected to the intake port,
said intake valve being opened as the first piston draws an air/fuel mixture into the first cylinder, and said intake valve being closed as the first piston moves to compress the mixture,
a transfer passageway in communication between the first and second cylinders,
a transfer valve in the passageway adjacent the first cylinder closing while the air/fuel mixture is drawn into the first cylinder and opening when the mixture in the first cylinder is compressed for transferring the compressed mixture from the first cylinder toward the second cylinder,
a catalyst positioned in the passageway downstream of the transfer valve for igniting the compressed mixture when the transfer valve is closed thereby powering the second piston,
an exhaust port connected to the second cylinder, and
an exhaust valve positioned in the exhaust port for exhausting gas from the second cylinder.

2. The apparatus of claim 1 including a heat exchanger positioned adjacent the passageway and connected to the exhaust port for heating the compressed mixture in the passageway from the waste exhaust heat.

3. The apparatus of claim 1 wherein the air/fuel mixing means includes a carburetor.

4. The apparatus of claim 1 wherein the second piston leads the first piston by a crank angle of between 45° and 90°.

5. The apparatus of claim 1 including,
combustion initiating means in the first cylinder.

6. The method of operating a catalytic internal combustion engine having a first cylinder with a first piston reciprocating therein and a second cylinder with a second piston reciprocating therein comprising, premixing all of the air/fuel mixture and inserting all of the mixture into the first cylinder while blocking the mixture from entering the second cylinder, and being exposed to the catalyst prior to compression of the mixture, compressing the mixture in the first cylinder, transferring the compressed mixture from the first cylinder thorugh a catalyst for igniting the compressed air/fuel mixture thereby providing an expanding gas, transferring the expanding gas to the second cylinder and closing communication between the first and second cylinders for providing a power stroke for the second piston, and exhausting the gas from the second cylinder.

7. The method of claim 6 including, initiating combustion of the compressed mixture in the first cylinder.

8. The method of claim 6 including, heating the compressed mixture as it leaves the first cylinder from the heat of the waste exhaust gas from the second cylinder.

* * * * *

UNITED STATES PATENT OFFICE
CERTIFICATE OF CORRECTION

Patent No.  4,715,326     Dated  December 29, 1987

Inventor(s)  Robert H. Thring

It is certified that error appears in the above-identified patent and that said Letters Patent are hereby corrected as shown below:

In the Abstract, line 6, change "communication" to -- communicating --

Column 3, line 55, correct the spelling of "rnage" to -- range --

Column 4, line 2, the second occurrence of "the" should be -- The --

Column 5, line 8, correct the spelling of "thorugh" to -- through --

Signed and Sealed this

Twenty-eighth Day of June, 1988

Attest:

DONALD J. QUIGG

Attesting Officer

Commissioner of Patents and Trademarks